United States Patent [19]

Miller

[11] Patent Number: 4,831,740
[45] Date of Patent: May 23, 1989

[54] DEVICE FOR INDICATING THE SIZE OF AN OBJECT

[75] Inventor: Dennis L. Miller, Ephrata, Pa.

[73] Assignee: RCA Licensing Corp., Princeton, N.J.

[21] Appl. No.: 54,909

[22] Filed: May 27, 1987

[51] Int. Cl.$^4$ ............................................. G01B 5/02
[52] U.S. Cl. ..................................... 33/501; 33/549; 33/501.6
[58] Field of Search ................. 33/148 R H, 149 R J, 33/172 B, 172 E, 549, 555, 556, 558, 501; 209/601, 602, 604, 605

[56] References Cited

U.S. PATENT DOCUMENTS

| | | | |
|---|---|---|---|
| 980,851 | 1/1911 | Updegraff | 33/148 H |
| 1,011,123 | 12/1911 | Degelow | 33/148 H |
| 2,179,517 | 11/1939 | Pelosi | 33/148 H |
| 2,392,010 | 1/1946 | Stevens | 33/148 H |
| 3,017,850 | 1/1962 | Whittier | 33/148 H |
| 3,775,854 | 12/1973 | Hofelt, Jr. et al. | 33/558 |

FOREIGN PATENT DOCUMENTS

| | | | |
|---|---|---|---|
| 90297 | 1/1961 | Denmark | 33/172 B |
| 612037 | 11/1948 | United Kingdom | 33/148 H |

Primary Examiner—William A. Cuchlinski, Jr.
Assistant Examiner—Patrick R. Scanlon
Attorney, Agent, or Firm—E. M. Whitacre; D. H. Irlbeck; L. L. Hallacher

[57] ABSTRACT

A device for indicating the size of an object, particularly a kinescope, includes a pivotal sensing-indicating arm. A sensing portion of the arm is urged by a lever which centers the kinescope on a temporary holding fixture. An indicating portion of the arm moves in response to the motion of the sensing portion and moves into alignment with one of a plurality of sensors to indicate the size of the object.

6 Claims, 2 Drawing Sheets

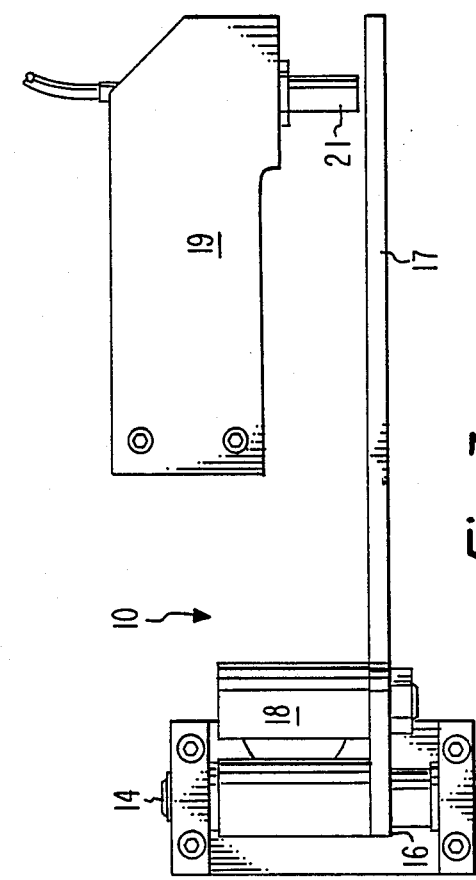
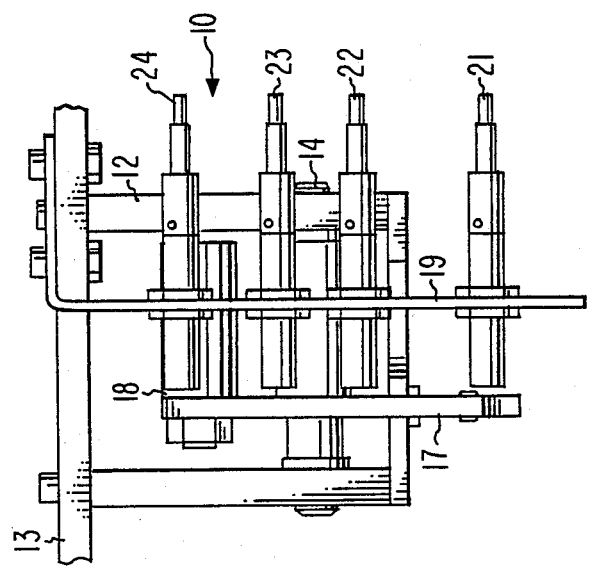

DEVICE FOR INDICATING THE SIZE OF AN OBJECT

BACKGROUND

This invention relates generally to size sensing devices and particularly to a device for indicating the size of an object.

The automatic processing and handling of manufactured objects frequently requires a knowledge of the size of the object being handled. An example is the manufacture and handling of kinescopes for color television receivers. Typically, in the manufacture of such kinescopes, tubes of various sizes move along a conveyor system to the various operating stations. The kinescopes come in varying sizes, such as 25, 26 and 27 inch diagonals, (63.5, 66, and 68.5 cm) and the various sizes are randomly disposed along the conveyor. For these reasons when a tube is to be placed into a processing, or testing, fixture it is typically necessary to place the kinescope in a fixture designed for a particular size kinescope. Accordingly, with automatic processing, it typically is necessary to sense the size of the kinescope to ensure that the kinescope is placed into a holding fixture which is designed to hold a particular size kinescope. For fully automatic processing it is necessary that the information relative to the size of the object being processed is provided automatically, rather than visually by an operator.

For these reasons there is a need for a device for indicating the size of an object being centered in a holding fixture by a centering mechanism. The present invention fulfills this need.

SUMMARY

A device for indicating the size of an object centered in a holding fixture by a centering lever includes a sensing-indicating arm pivotably mounted about a pivot axis. The arm includes a sensing portion extending from the pivot axis in a first direction and an indicating portion extending from the pivot axis in a second direction. The sensing portion is responsive to motion of the centering lever to pivot the arm and effect motion of the indicating portion whereby the indicating portion moves a preselected distance in accordance with the size of the sensed object. A plurality of sensors is arranged at preselected locations in accordance with various object sizes. The sensors sense the indicating portion of the arm whereby one of the sensors senses the indicating portion to indicate the size of the object.

BRIEF DESCRIPTION OF THE DRAWINGS

FIG. 2 is a front view of the preferred embodiment of FIG. 1.

FIG. 3 is a top view of the preferred embodiment of FIG. 1.

DETAILED DESCRIPTION

Figure 1:
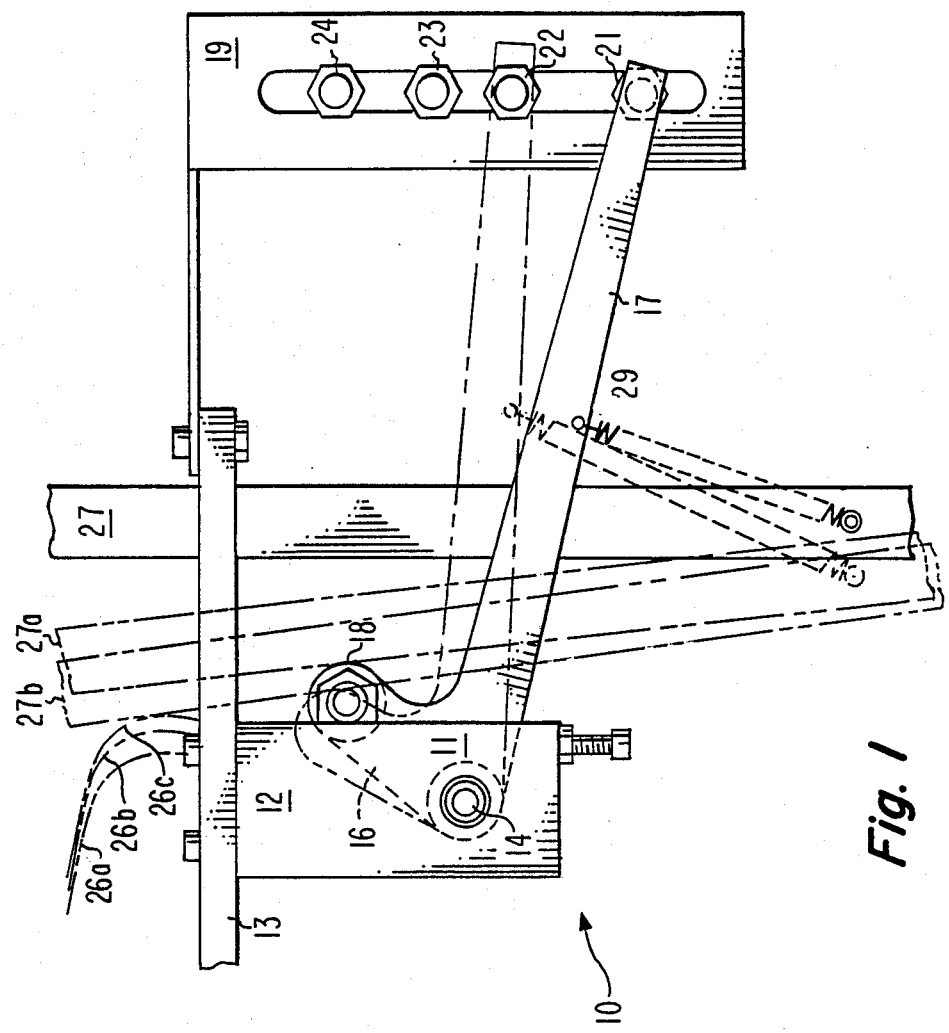
FIG. 1 is a side view of a preferred embodiment.

In FIGS. 1 and 2, a device 10 for indicating the size of an object includes a sensing-indicating arm 11. The sensing-indicating arm 11 is mounted in a bracket 12 which is affixed to a permanent convenient mounting plate 13. The sensing-indicating arm 11 is angularly configured and has a pivot axis 14 arranged in the proximity of the apex of the angle. The sensing-indicating arm 11 has a sensing portion 16 which extends from the pivot axis 14 in a first direction. The sensing-indicating arm 11 also has an indicating portion 17 extending from the pivot axis 14 in a second direction. The sensing/portion 16 and the indicating portion 17 are dimensioned in a particular ratio with the indicating portion 17 being substantially longer than the sensing portion 16. Accordingly, a slight linear movement of the free end of the sensing portion 16 results in a substantially multiplied movement of the free end of the indicating portion 17. A roller 18 is rotatably mounted in the proximity of the free end of the sensing portion 16.

A sensor mounting bracket 19 is mounted in the proximity of the bracket 12. The brackets 12 and 19 can be integral to ensure the accurate spacing, if desired. A plurality of sensors 21, 22, 23 and 24 are mounted on the bracket 19 at preselected locations in accordance with known sizes of various objects to be detected. In FIGURES 2 and 3, the free end of the indicating portion 17 of the sensing-indicating arm 11 is in the close proximity of the sensor 12. The sensors 22 to 24 are mounted to the bracket 19, in a manner similar to the sensor 21, to be within the close proximity of the free end of the indicating portion 17 when an object of a particular size is sensed. The sensors 21 to 24 can be of any one of many well-known types of sensors, such as magnetic detectors, vacuum detectors, or light sensors. The sensors give an electrical output signal to inform the processing equipment (not shown) that a particular size of tube is positioned in the holding fixture.

The device 10 is mounted in the proximity of a holding fixture (not shown) upon which the object being processed is to be centered prior to being transferred to a process, or testing fixture. When the object to be processed and centered is a kinescope, any one of several sizes can be placed upon the holding fixture in any random order. Three possible sizes of kinescopes 26a, 26b and 26c are partially shown in phantom to represent 25 inch, 26 inch and 27 inch diagonal kinescopes. Typically, in the production of kinescopes various sizes randomly move along the conveying line. The kinescopes are individually transferred to a temporary holding fixture, and centered in the temporary holding fixture prior to being transferred to a processing or testing, fixture. Accordingly, it is necessary to sense and indicate the size of the particular kinescope in the temporary holding fixture so that the kinescope is subsequently transferred to a fixture capable of receiving the particular size of kinescope being processed. Three possible sizes of kinescopes are partially shown in phantom as 26a, 26b, and 26c. The kinescope 26a, 26b or 26c, is centered on the unshown temporary holding fixture by a centering lever 27 which is a part of a factory automated handling mechanism, such as a Unimate or a Rosenlew article moving device, which forms no part of the present invention. The lever 27 rotates counterclockwise, as indicated by the phantom positions 27a and 27b, to nudge the kinescope against stops which are provided on the temporary holding fixture. During rotation the centering lever 27 contacts the roller 18 which is supported by the sensing portion 16 of the sensing-indicating arm 11. The arm 11 thus rotates counterclockwise about the pivot axis 14 causing the indicating portion 17 of the arm 11 to move upwardly into the proximity of the sensors 21 through 24, as indicated by the phantom position. When the kinescope is a smaller size tube, the lever 27 rotates the greatest distance to the kinescope 26a thereby causing the maximum excursion of the roller 18 against which the centering lever 27 operates. Accordingly, the free end of the indicating portion 17 moves the maximum distance into the proximity of the sensor 24 to indicate the presence of the smaller size of kinescope in the temporary holding fixture. The other two sensors 22 and 23 are located to lie in the close proximity of the free end of the indicating portion 17 when the other sizes of kinescopes, such as 26 inch and 27 inch diagonal tubes, are present in the temporary holding fixture.

A resilient member 29, such as a spring, is fastened to the sensing-indicating arm 11, and to the centering lever 27 to return the sensing-indicating arm 11 to a neutral position when no kinescope is being centered. In this position the indicating portion 17 has the free end in the close proximity of the sensor 21 to indicate that no kinescope is present in the temporary holding fixture and therefore the fixture is ready to receive and center the next incoming kinescope.

What is claimed is:

1. A device for indicating the size of an object centered in a temporary holding fixture by a centering lever comprising:
    a pivotable sensing-indicating arm mounted about a pivot axis, said sensing-indicating arm including a sensing portion extending from said pivot axis in a first direction and an indicating portion extending from said pivot axis in a second direction, means for biasing said sensing portion against the centering lever to pivot said arm and effect motion of said indicating portion whereby said indicating portion moves a preselected distance in accordance with the size of said object; and
    a plurality of sensors arranged in the proximity of said indicating portion and at preselected locations in accordance with various object sizes, for sensing said indicating portion whereby one of said sensors senses said indicating portion to indicate the size of said object.

2. The device of claim 1 wherein said sensing-indicating arm is angular, and wherein said pivot axis is located at the apex of the angle of said sensing-indicating arm.

3. The device of claim 2 wherein said sensing portion and said indicating portion are dimensioned in accordance with a preselected ratio whereby linear motion of said indicating portion exceeds the linear motion of said sensing portion.

4. The device of claim 3 further including a roller rotatably arranged on a free end of said sensing portion.

5. The device of claim 4 wherein said means for biasing is a resilient member arranged between said indicating portion and said centering lever for biasing said sensing-indicating arm to a neutral position.

6. The device of claim 5 wherein said object is a kinescope and wherein said sensors are located to indicate the size of various size kinescopes.

* * * * *